Feb. 4, 1958     T. F. ESERKALN     2,821,866
TRANSMISSION CONTROL MECHANISM
Filed Feb. 20, 1956     5 Sheets-Sheet 1

FIG. 1

INVENTOR.
Theodore F. Eserkaln
BY
Attorney

FIG. 4

INVENTOR.
Theodore F. Eserkaln
BY
Attorney

United States Patent Office 2,821,866
Patented Feb. 4, 1958

2,821,866
TRANSMISSION CONTROL MECHANISM

Theodore F. Eserkaln, Elm Grove, Wis., assignor to Kempsmith Machine Company, West Allis, Wis., a corporation of Wisconsin Application February 20, 1956, Serial No. 566,427

13 Claims. (Cl. 74—472)

This invention relates to a transmission control mechanism adapted for use on transmissions which include a power input shaft normally driven at a constant speed, a power output shaft, and shiftable gearing for selectively altering the speed of the power output shaft with respect to that of the power input shaft.

While the device of the present invention is adapted for use in conjunction with any gear shift transmission, it has particular advantages when utilized in transmissions which require the shifting of gears including those which are normally traveling at relatively high speeds.

For the purpose of illustrating the present invention, I have shown an embodiment thereof as applied to the spindle driving transmission of a milling machine in which the spindle may be driven at any of a plurality of selected speeds ranging from 25 to 1500 revolutions per minute through the manipulation of a spindle speed selector.

The primary object of the present invention resides in the provision of a simple and effective means for affording adequate protection against the clashing of gears during their shifting operation to effect the selection of the desired speed for the spindle and more particularly in the higher speed range of the transmission.

Another object of the invention resides in the provision of new and improved means for facilitating the shifting of transmission speeds without requiring the necessity of shutting down the machine.

Another object of the invention resides in the provision of electrical control means which is responsive to the presence of a speed change selector in a selected speed position for controlling the normal driving operation of the transmission.

Another object of the invention resides in the provision of electrical control means which is responsive to the absence of the speed change selector from a selected speed position to preclude the restarting of the transmission for normal driving operation until such time as the speed change gears are properly meshed and the speed change selector has assumed a selected speed position.

Another object of the present invention resides in the provision in a control circuit of a manually operable switch having run and jog positions, said manually operable switch being under the control of the electrical control means which is responsive to the presence of a speed change selector in a selected speed position, the manually operable switch being effective in run position for controlling the normal driving operation of the transmission and being effective in jog position to energize the power circuit of a driving motor momentarily to effect the jogging of the gears to facilitate their manual shifting under the control of the speed change selector.

Another object of the invention resides in the provision in a control circuit normally under the control of a speed change selector of an electrical means in the form of a plugging switch which is effective to reverse the flow of current through the spindle driving motor to effect the instantaneous stopping of the motor and the transmission driven thereby.

Another object of the invention resides in the provision of electrical means in a control circuit which is effective to render the machine dead when the speed change selector is moved from a selected speed position.

Another object of the invention resides in manually operable means in the form of a selector switch having run and jog positions which are respectively operable to effect the energization and normal driving operation of the spindle motor and associated transmission when the switch is in run position and operative when the switch is in jog position to effect momentary energization of the power circuit, spindle driving motor, and associated transmission to effect the jogging action of the transmission to facilitate the manual shifting of the gears under the action of a speed change selector.

Other objects and advantages will become apparent from the following description of an illustrative embodiment of the present invention.

While the transmission control mechanism embodying the teachings of the present invention is well adapted for use in conjunction with any gear shift transmission, it has particular and marked advantages when utilized in transmissions which require the shifting of gears which are normally traveling at a high rate of speed.

The present invention provides a simple and effective means whereby the possibility of damage caused by clashing of the gears during their shifting operation is completely eliminated.

For the purpose of illustrating the adaptability of the present transmission control mechanism for use in conjunction with a gear shift transmission, I have chosen to illustrate and describe one form of its embodiment as applied to the spindle driving transmission of a milling machine.

Figure 4:
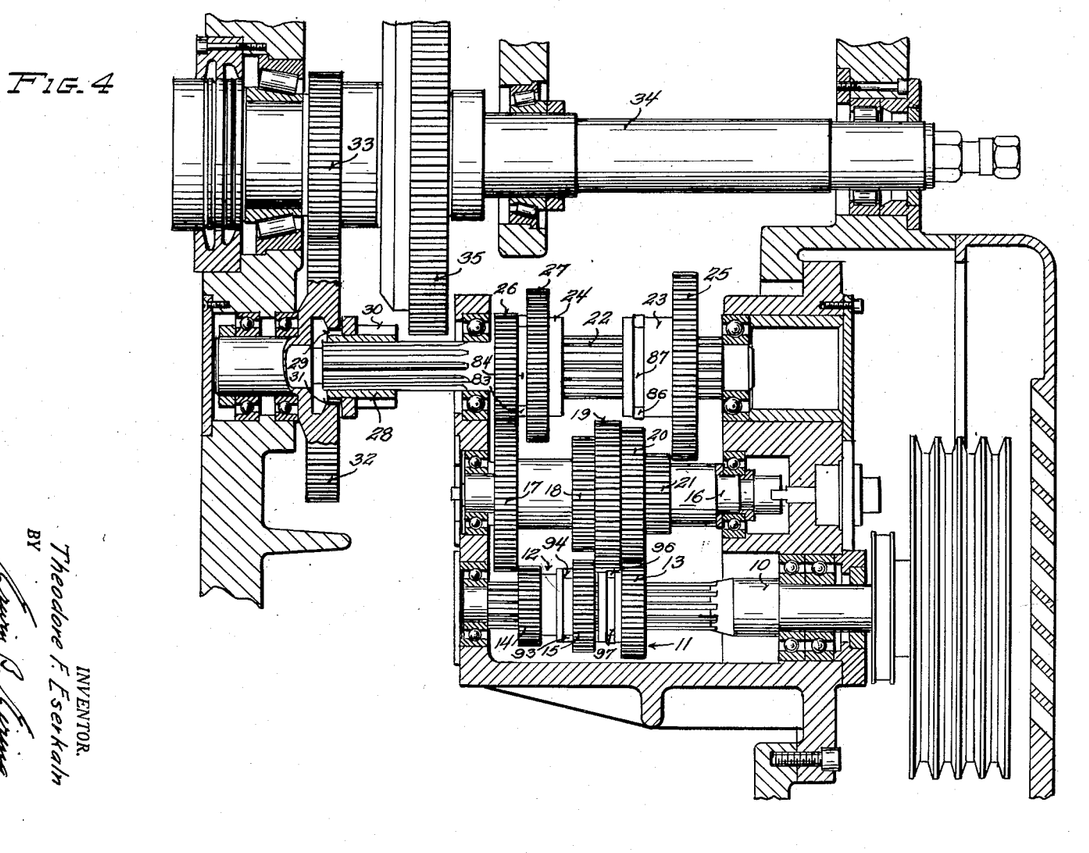
Fig. 4 is a vertical longitudinal sectional view taken substantially on the axial plane of the spindle showing the several gear sets in the meshing relationship to provide high speed rotation of the spindle with respect to the normally constant speed of the power input shaft.
Figure 5:
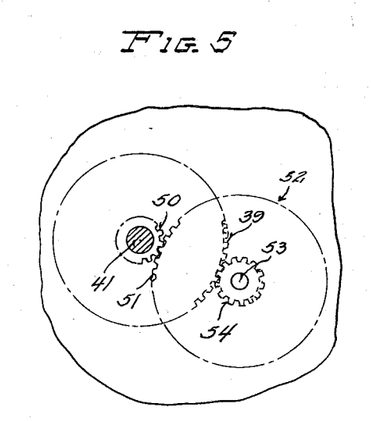
Fig. 5 is a fragmentary vertical sectional view, taken on the line 5—5 of Fig. 1, showing the gearing interposed between the speed change selector crank shaft and the speed indicator dial.

Referring more particularly to Fig. 4 of the accompanying drawings, I have therein illustrated that portion of a spindle transmission which includes a power input shaft 10 journalled for free rotation in suitable anti-friction bearings mounted in a suitable supporting frame. The shaft 10 is adapted to be driven at a substantially constant speed in a manner to be hereinafter more specifically described. The speed change gearing includes a pair of axially shiftable members 11 and 12 in splined driving relationship with the power input shaft 10. The member 11 includes a gear 13 and the member 12 includes a gear couplet comprising gears 14 and 15. A secondary splined shaft 16 disposed in parallel spaced relationship with the shaft 10 is also journalled for free rotation in suitable anti-friction bearings. A plurality of gears 17, 18, 19, 20, and 21 which are splined on the shaft 16 are disposed in axial spaced relationship along the shaft 16 to selectively transmit power from the primary shaft 10 to a tertiary splined shaft 22 which is also disposed in parallel spaced relationship with the primary and secondary shafts 10 and 16 and is mounted for free rotation in suitable anti-friction bearings. A pair of members 23 and 24 are mounted for slidable axial movement on the splined shaft 22. The member 23 includes a gear 25 and the member 24 includes a couplet comprising gears 26 and 27. One end of the splined shaft 22, which projects beyond its mounting frame, serves as a support for an axially shiftable member 28 which includes a couplet comprising gears 29 and 30. In one position of adjustment of the member 28, the gear 29 meshes with an internal gear 31 which is formed in the body of an external gear 32 having a hub portion which is journalled for free rotation in anti-friction bearings mounted in a portion of the column of the machine tool. The external gear 32 is disposed in constant meshing relationship with a gear 33 fixedly mounted on a spindle shaft 34. In the other operating position of the member 28, the gear 30 meshes with a gear 35 which is also fixedly mounted on the spindle shaft 34. With the several gears in the positions shown in Fig. 4 of the accompanying drawings, the spindle shaft 34 is driven at its highest speed wherein power is transmitted from the primary shaft 10 to the tertiary shaft 22 through the meshing engagement between gears 13 and 20, gears 17 and 26 and thence through gears 30, 31, and 32 to the gear 33 on the spindle shaft 34. The lowest possible speed for the spindle shaft 34 is obtained when power is transmitted from the primary shaft 10 to the secondary shaft 16 through the meshing engagement between gears 14 and 17 and thence to the tertiary shaft 22 through the meshing engagement between gears 21 and 25 and thence to the spindle shaft 34 through the meshing engagement between gears 30 and 35. Various intermediate speeds are obtainable through the shifting of the several axially movable members disposed on the splined shafts 10 and 22 under the influence of a speed selector about to be described.

Figure 1:
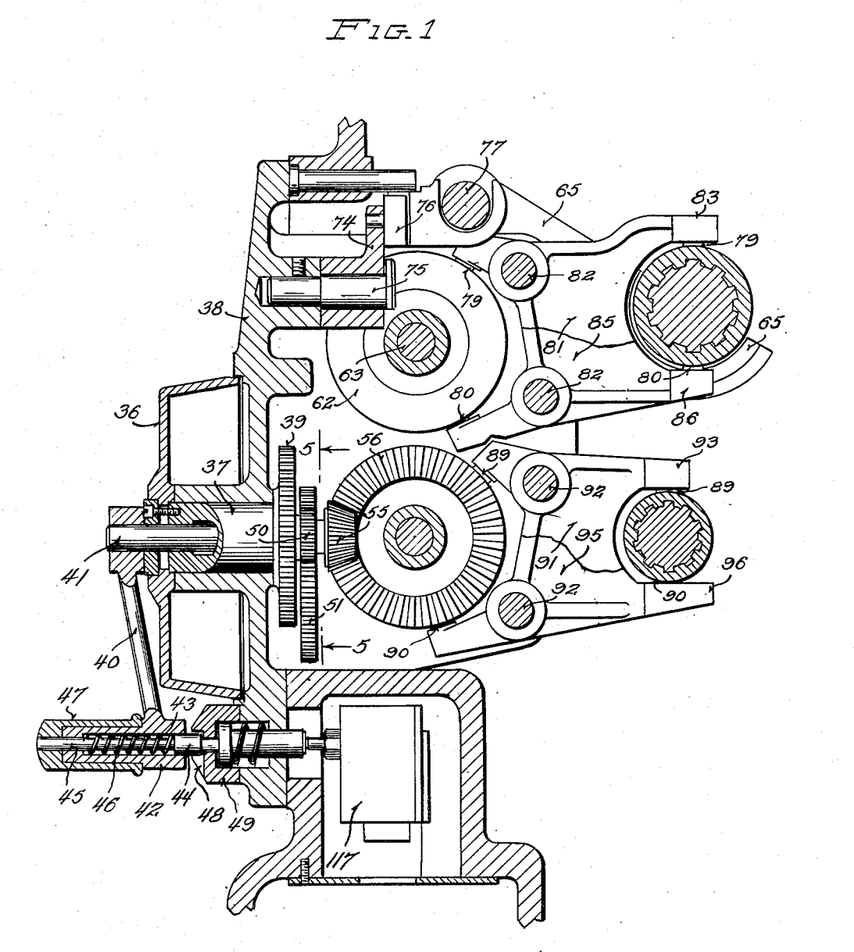
Figure 1 is a vertical sectional view of a portion of a milling machine spindle transmission in which the transmission control mechanism embodying the teachings of the present invention is incorporated.
Figure 2:
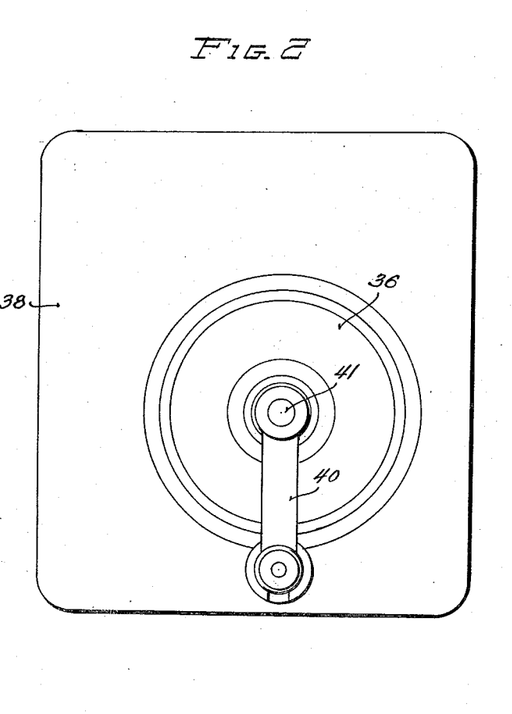
Fig. 2 is a front elevational view of some of the structure shown in Fig. 1 including the manually operable speed change selector which is effective to select the desired speed of the spindle with respect to that of the constant speed of the power input shaft.
Figure 3:
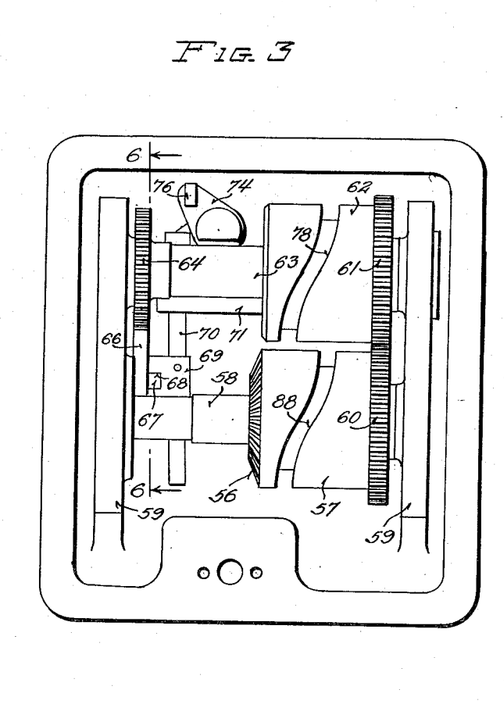
Fig. 3 is a rear elevational view of cam means operative under the control of the speed change selector for altering the relative position of the several gear sets of the transmission to effect the selected speed for the driven spindle.

The speed selector chosen for illustrative purposes in the accompanying drawings (see Fig. 1) comprises a dial 36 which carries speed indicia on its face. The dial 36 is fixedly attached to a hollow shaft 37 which is journalled in a boss formed on a dial mounting plate 38 on the machine tool. Rotation of the dial is effected through the medium of a gear 39 which is formed integrally with the hollow shaft 37 in a manner to be hereinafter more specifically described. The means for effecting rotation of the dial 36 comprises a crank 40 having one end thereof secured to a shaft 41 which is journalled in the hollow shaft 37 on which the dial 36 is mounted. The outer extremity of the crank 40 includes a cylindrical body portions 42 having an axially disposed bore 43 in which a plunger 44 is mounted for axial sliding movement. The rod portion of the plunger 44 is of reduced diameter and is slidably receivable through a bore 45 in the body portion 42. A compression spring 46 surrounds that portion of the plunger rod disposed between the bore 45 and the head of the plunger 44 to provide a means for normally urging the plunger 44 to its forwardly extended position. A gripping handle 47 is secured to the outer extremity of the plunger rod to provide a means for retracting the plunger 44 from its forwardly projecting position in which it is receivable in a recess 48 of a boss 49 which serves as a means for releasably retaining the crank arm 40 of the speed selector mechanism in a particular selected speed locating position.

Figure 6:
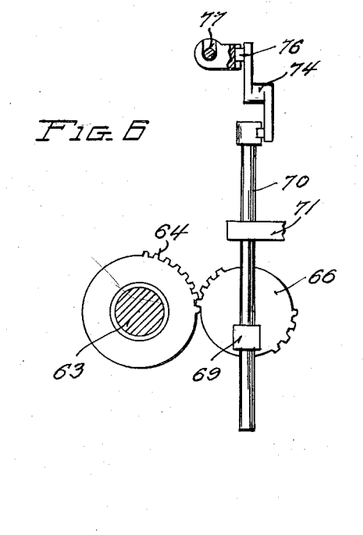
Fig. 6 is a fragmentary vertical sectional view, taken on the line 6—6 of Fig. 3, showing the intermittent gearing and associated linkage mechanism which is operative to actuate the range change mechanism.
Figure 7:
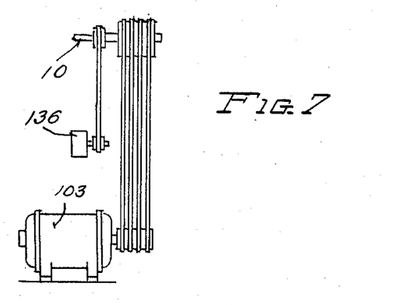
Fig. 7 is a schematic view showing a V-belt driving connection between the driving motor and the power input shaft of the transmission together with a zero speed switch which is operatively associated with the switch in the control circuit that is selectively rendered operative or inoperative in accordance with the presence or absence of the speed change selector in its speed selecting position.

When a speed change of the spindle 34 is desired, the gripping handle 47 of the crank 40 is pulled outwardly against the action of the compression spring 46 to release the latching engagement between the forward end of the plunger 44 and the recess 48 which normally releasably retains the gear shifting mechanism in any one of its plurality of speed change positions. Rotation of the crank 40 transmits rotary movement to the dial 36 through the medium of a double speed reduction gearing comprising a gear 50 formed on the shaft 41, a gear 51 of a gear couplet 52 journalled on a stub shaft 53, a gear 54 of the couplet 52 and the gear 39 formed on the hollow shaft 37 on which the dial 36 is mounted. A bevel gear 55 also formed integrally with the shaft 41 is disposed in meshing relationship with a bevel gear 56 formed on one end of a drum cam 57 which is freely rotatably mounted on a shaft 58 which is fixedly positioned in a suitable mounting frame 59. An intermittent gear 60 secured to the opposite end of the drum cam 53 is disposed in meshing relationship with an intermittent gear 61 fixedly positioned on one end of another drum cam 62 which is keyed to a shaft 63 which is journaled in parallel spaced relationship in suitable anti-friction bearings carried by the frame 59. An intermittent gear 64 which is keyed on the shaft 63 in axial spaced relationship with the drum cam 62 provides the means through which motion is imparted to a range change fork 65 to effect the axial movement of the member 28 on the shaft 22 to selectively engage the gear 29 with the gear 31 for high range transmission or the gear 30 with the gear 35 for low speed range transmission. The intermittent gear 64 meshes with and drives an intermittent gear 66 (see Fig. 6) which is provided with an eccentric pin 67 receivable in a slot 68 formed in a block 69 which is anchored on a vertically movable shaft 70 journalled for sliding movement in a stationary flange 71 formed on the dial mounting plate 38. The head of the shaft 70 is provided with a transverse slot or groove 72 adapted to receive a pin 73 carried by one arm of a bell crank 74 journalled for rocking movement on a stub shaft 75 secured in a dial mounting plate 38. The other arm of the bell crank 74 is provided with a block 76 which is receivable in the grooved portion of the range change shifting fork 65 which is slidably mounted on a horizontally disposed shaft 77. The drum cam 62 is provided with an annular cam groove 78 in which a pair of cam followers 79 and 80 ride. The cam follower 79 is mounted on a gear shifting fork 81 which is slidably movable on a pair of supporting bars 82 and includes at the end opposite the cam follower 79, a fork portion 83, which engages a groove 84 formed in the member 24 to effect the shifting of the gears 26 and 27 into respective engagement or disengagement with the gears 17 and 18 disposed on the secondary shaft 16. The cam follower 80 is mounted on a gear shifting fork 85 which is also slidably mounted on the supporting bars 82 and includes a fork portion 86 which engages a groove 87 formed in the member 23 to effect the shifting of the gear 25 into or out of engagement with the gear 21 disposed on the secondary shaft 16.

The drum cam 57 is also provided with an annular cam groove 88 in which a pair of cam followers 89 and 90 ride. The cam follower 89 is mounted on a gear shifting fork 91 which is slidably movable on a pair of supporting bars 92 and includes a fork portion 93 which engages a groove 94 in the member 12 to effect the shifting of the member 12 so that its gears 14 and 15 either mesh respectively with gears 17 and 19 or lie in a neutral position out of engagement with either of the gears 17 and 19 which are disposed on the secondary shaft 16. The cam follower 90 is mounted on a gear shifting fork 95 which is also slidably mounted on the supporting bars 92 and includes at the end opposite the cam follower 90, a fork 96, which engages a groove 97 formed in the shiftable member 11 which includes the gear 13. Lateral movement of the shifting fork 96 serves in one position to shift the gear 13 into meshing engagement with the gear 20 and in its remaining positions to shift the gear 13 out of meshing engagement with the gear 20 which is mounted on the secondary shaft 16. As the speed selector crank 40 is rotated, it effects the movement of the several shifting forks in timed relationship to alter the relative positions of the several shiftable gears and gear couplets to effect the meshing engagement between proper sets of gears to alter the speed of the spindle shaft in accordance with the requirements of the work at hand. The mechanism is so arranged that the crank 40 assumes the identical position at the completion of each shifting of the gears to effect the selected speed of the spindle shaft 34. Release of the gripping engagement of the handle 47 of the crank 40 serves to effect the releasable latching of the crank 40 in its selected speed change position through the action of the spring 46 on the plunger 44 and the resulting cooperating relationship between the plunger 44 and the recess 48 in the boss 49 serves to effect the desired releasable retention of the crank 40 and the several gears in their selected speed change relationship. Since the crank 40 of the speed change selector mechanism assumes the identical location in each of its speed selecting positions, it provides a ready means through which effective control may be exercised over the power circuit for the spindle motor which provides the driving power for the spindle 34 of the machine tool.

Figure 8:
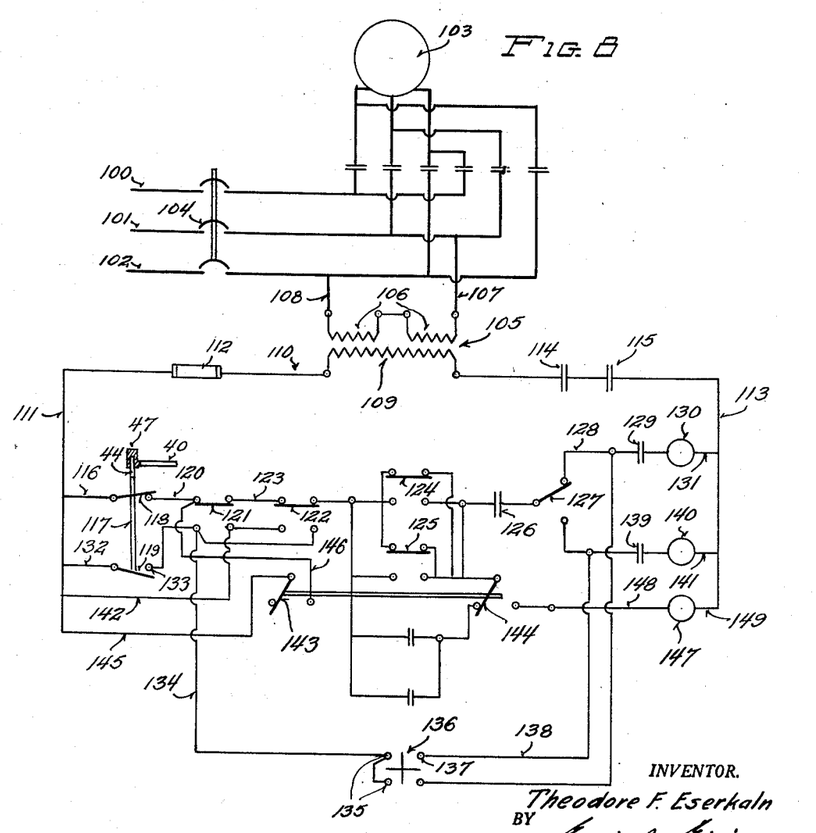
Fig. 8 is a schematic wiring diagram of a power circuit for driving the power output shaft of the transmission showing the front and rear push button controls and a control circuit including the mechanically actuated electrical transmission control mechanism of the present invention.

The power circuit comprises lead lines 100, 101 and 102 which are connected to the spindle driving motor 103 in the usual manner. A circuit breaker 104 is provided in the power lines. A transformer 105 has the opposite ends of its primary winding 106 connected respectively to the power lines 101 and 102 by leads 107 and 108. The secondary winding 109 of the transformer 105 provides a lower voltage current for a control circuit 110.

The control circuit 110 includes a lead 111 having a control fuse 112 therein, and a lead 113 provided with series connected overload relays 114 and 115 adapted to function respectively for controlling right and left hand rotation of the spindle motor 103. A plurality of switches arranged in series relationship are connected between the leads 111 and 113 to provide manually operable means for selectively starting and stopping the spindle motor 103 and determining its direction of rotation. A conductor 116 carries current from the lead 111 to one contact of a double arm switch 117 which includes switch arms 118 and 119 arranged for simultaneous movement under the control of the plunger 44 of the speed selector crank 40. When the speed selector crank 40 is in a speed selected position, the arm 118 bridges a pair of contacts to direct current through a conductor 120 to one contact of a normally closed front stop switch 121. The other contact of the switch 121 is connected to one contact of a normally closed rear stop switch 122 through a conductor 123. The other contact of the rear stop switch 122 is connected to a pair of contacts on one side of a normally open front starting switch 124 and a pair of contacts on one side of a normally open rear starting switch 125 through suitable conductors. When either the front or rear starting switch 124 or 125 is moved to closed position, current passes through conductors leading from the other contact of the switches through a control or selector relay 126 and then to one contact of a switch 127 for selectively controlling the direction of rotation of the spindle motor. In the present diagram, the bridging arm of the switch 127 is shown in a position to establish contact for left hand rotation of the spindle motor through a conductor 128, a motor coil overload relay 129 and coils 130 of the motor 103 which control left hand rotation of the same. The other ends of the coils 130 are connected to the other lead 113 of the control circuit. From the foregoing description, it will be noted that with the several switches in the positions described, the spindle driving motor 103 may be energized to rotate in a left hand direction upon the manual closing of either the front starting switch 124 or the rear starting switch 125.

Additional control for the spindle motor is also interposed between the leads 111 and 113 of the control circuit 110. Some of the additional control means comprises a conductor 132 connected from the lead 111 to one contact of the arm 119 of the switch 117. When the speed selector mechanism is in a selected speed position, the switch arm 119 is out of contact with one contact 133 of the switch 117. If the speed selector crank arm 40 is moved from a selected speed position, the circuit closing contact of the arm 118 of the switch 117 is broken to cut off power to the spindle driving motor 103 and simultaneously with the breaking of the power circuit through movement of the arm 118 electrical contact is established through movement of the arm 119 of the switch 117 with the switch contact 133. A conductor 134 which has one end connected to the contact 133 of the switch 117 carries current to a pair of contacts 135 of a zero speed switch 136 which includes means for establishing an electrical connection between one of the contacts 135 of the zero speed switch 136 and a contact 137 which is connected by a conductor 138 to a motor coil overload relay 139 and motor coils 140 and a conductor 141 to the lead 113 of the control circuit 110. The energizing of the motor coils 140 for right hand rotation of the spindle motor effects the instantaneous stopping of the armature shaft of the spindle driving motor 103 to bring the entire spindle driving transmission to a stop and render the machine incapable of manual restarting for normal operation until the speed selector mechanism is repositioned in a speed selecting position.

Additional control means is provided for rendering the control circuit responsive to the manual manipulation of either the front or rear stop switches 121 and 122 respectively. This control means comprises a conductor 142 which connects the control circuit lead 111 to one contact of each of the stop switches 121 and 122. The other contacts of the switches 121 and 122 are electrically connected through the conductor 134 to effect the operation of the zero speed switch 136 in the manner previously described when either of the switches 121 are moved to break the power circuit previously described and establish an electrical connection between the other pair of contacts to carry current through the conductors 142 and 134 to the zero speed switch 136 to effect the instantaneous stopping of the spindle driving motor 103 in the manner previously described.

Additional means is provided in the control circuit 110 for manually selectively placing the control circuit in condition to permit the power circuit of the spindle motor 103 to be momentarily energized to effect a jogging action of the transmission to facilitate the proper meshing engagement between the various gear sets of the spindle transmission under the manipulation of the speed change selector through the rotation of the crank 40. This means comprises a pair of mechanically connected selector switches 143 and 144 adapted for manual positioning in either run or jog positions. The selector switch 143 is energized through a conductor 145 having one end connected to the lead 111 of the control circuit 110 and its other end connected to the arm of the selector switch 143. As previously stated, each of the switches 143 and 144 are mechanically connected and selectively positionable in either run or jog position. In order to effect normal operation of the transmission, the switches 143 and 144 are moved to run position. When the speed selector crank is moved from a selected speed position, breaking the power circuit to the spindle driving motor 103, when the switches 143 and 144 are in run position, the spindle transmission is instantaneously stopped in the manner previously described and the transmission remains dead and cannot be re-energized to effect a desired speed change without throwing the connected switches 143 and 144 to their jog position. When the switches 143 and 144 are moved to their jog position, current is transmitted through the arm of the switch 143 to the jog contact and thence through a conductor 146 to one contact of the front stop switch 121 from which it traverses the path of travel previously described in connection with the several series arranged manually operable switches to effect the momentary energizing of the spindle driving motor through the operation of a timing relay 147 which is connected on one side through a conductor 148 to the jog contact of the selector switch 144. The other side of the control relay 147 is connected to the lead 113 of the control circuit 110 by a conductor 148. From the foregoing it will be noted that with the selector switches 143 and 144 in jog position, it is possible to momentarily energize the spindle driving motor 103 to effect momentary partial rotation of the motor with the consequent partial rotation of the several gears of the spindle transmission to greatly facilitate the operation of selectively changing the speed of the spindle transmission through rotation of the speed selector crank 40.

From the foregoing description of the various means embodied in the control circuit 110 of the present machine, it will be noted that the normal operation of the spindle driving motor, is at all times, responsive to the presence of the speed change selector in a selected speed position. Furthermore, the normal operation of the spindle transmission may only be effected when the mechanically connected selector switches 143 and 144 are in their run position. If for any reason the speed change selector is removed from a speed selected position, the spindle transmission is automatically brought to an instantaneous stop through the operation of the zero speed switch 136 and its associated control means. With the speed change selector removed from a selected speed change position, the entire spindle transmission of the machine is rendered dead and cannot be re-energized except by the manual movement of the selector switches 143 and 144 from their run to their jog position. With the selector switches 143 and 144 in their jog position, the timing relay 147 is put into operation with the result that the spindle driving motor 103 is energized only momentarily to effect only partial rotation of the several gears in the spindle transmission for the purpose of facilitating a speed change of the spindle transmission through the manipulation of the speed change selector crank 40.

From the foregoing description of an illustrative embodiment of the present invention, it will be noted that a highly efficient and effective control means has been provided which greatly facilitates the shifting of transmission speeds, particularly in the higher speed range of the transmission without encountering the usual clashing of gears during the shifting operation.

While the invention has been described in considerable detail in the foregoing specification, it is to be understood that various changes may be made in its embodiment without departing from or sacrificing any of the advantages hereinafter claimed.

I claim:

1. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, a control circuit for said power circuit, and a switch in said control circuit under the control of said speed change selector and responsive to the absence of said speed change selector in a selected speed position to render said power circuit inoperative.

2. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, a control circuit for said power circuit, and a switch in said control circuit under the control of said speed change selector and responsive to the presence of said speed change selector in a selected speed position to render said power circuit operative and responsive in the absence of said speed change selector from a selected speed position to render said power circuit inoperative.

3. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable switch having selective run and jog positions, and a switch in said control circuit under the control of said speed change selector and responsive to the presence of said speed change selector in a selected speed position to render said power circuit operative when said manually operable switch is in run position.

4. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable switch having selective run and jog positions, and a switch in said control circuit under the control of said speed change selector and responsive to the absence of said speed change selector in a selected speed position to render said power circuit inoperative when said manually operable switch is in run position.

5. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable switch having selective run and jog positions, and a switch in said control circuit under the control of said speed change selector and responsive to the presence of said speed change selector in a selected speed position to render said power circuit operative and responsive in the absence of said speed change selector from a selected speed position to render said power circuit inoperative when said manually operable switch is in run position.

6. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, and a switch under the control of said speed change selector and responsive to the presence of said speed change selector in a selected speed position to render said power circuit operative under the control of said start switch when said manually operable switch is in run position.

7. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, and a switch under the control of said speed change selector and responsive to the absence of said speed change selector in a selected speed position to render said power circuit operative when said manually operable start switch is actuated and said other manually operable switch is in jog position to momentarily energize said driving motor to effect a jogging motion to said transmission whereby the shifting of its gearing is facilitated under the operation of said movable speed change selector.

8. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, and a switch under the control of said speed change selector and responsive to the presence of said speed change selector in a selected speed position to render said power circuit operative under the control of said start switch when said manually operable switch is in run position and responsive in the absence of said speed change selector from a selected speed position to render said power circuit operative when said manually operable switch is in jog position and said manually operable start switch is actuated to momentarily energize said driving motor to effect a jogging motion to said transmission whereby the shifting of its gearing is facilitated under the operation of said movable speed change selector.

9. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, a switch under the control of said speed change selector, and a zero speed switch under the control of said last named switch, said speed change selector controlled switch being responsive to the presence of said speed change selector in a selected speed position to render said power circuit operative under the control of said start switch when said manually operable switch is in run position and responsive to the absence of said speed change selector from a selected speed position to render said zero speed switch operative to plug said driving motor to stop the same and said transmission substantially instantaneously.

10. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, the run position of said manually operable switch being essential for normal operation of said transmission under control of said speed change selector, a switch under the control of said speed change selector, and a zero speed switch under the control of said last named switch, said speed change selector controlled switch being responsive to the presence of said speed change selector in a selected speed position to render said power circuit operative under the control of said start switch when said manually operable switch is in run position and responsive to the absence of said speed change selector from a selected speed position to render said zero speed switch operative to plug said driving motor to stop the same and said transmission substantially instantaneously.

11. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, the run position of said manually operable switch being essential for normal operation of said transmission under control of said speed change selector, a switch under the control of said speed change selector, and a zero speed switch under the control of said last named switch, said speed change selector controlled switch being responsive to the presence of said speed change selector in a selected speed position to render said power circuit operative under the control of said start switch when said manually operable switch is in run position and responsive to the absence of said speed change selector from a selected speed position to render said zero speed switch operative to plug said driving motor to stop the same and said transmission substantially instantaneously, said control circuit being thereby rendered inoperative until such time as said manually operable switch is moved to its jog position wherein said power circuit may be reenergized by said manually operable switch to momentarily energize said driving motor to effect a jogging motion to said transmission whereby the shifting of its gears is facilitated under the operation of said movable speed change selector.

12. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, the run position of said manually operable switch being essential for normal operation of said transmission under control of said speed change selector, a switch under the control of said speed change selector, and a zero speed switch under the control of said last named switch, said speed change selector controlled switch being responsive to the absence of said speed change selector from a selected speed position to render said zero speed switch operative to plug said driving motor to stop the same and said transmission substantially instantaneously and render said power circuit incapable of reenergization until such time as said manually operable switch is moved to its jog position.

13. A control mechanism for facilitating the shifting of gears in a variable speed transmission including a power driven input shaft rotatable at a substantially constant speed, a power output shaft, and shiftable gearing interposed between said input and output shafts for selectively altering the speed of said output shaft with respect to said input shaft, said control means comprising a movable speed change selector operatively connected with said shiftable gearing to change the positions and meshing relationship between said gearing to alter the speed of said output shaft, a driving motor for said input shaft, an electrical power circuit for driving said motor, and a control circuit for said power circuit, said control circuit including a manually operable start switch, a manually operable switch having selective run and jog positions, the run position of said manually operable switch being essential for normal operation of said transmission under control of said speed change selector, a switch under the control of said speed change selector, and a zero speed switch under the control of said last named switch, said speed change selector controlled switch being responsive to the absence of said speed change selector from a selected speed position to render said zero speed switch operative to plug said driving motor to stop the same and said transmission substantially instantaneously and render said power circuit incapable of reenergization until such time as said manually operable switch is moved to its jog position wherein a timing relay serves to effect momentary energization of said driving motor to effect the jogging motion in said transmission whereby the shifting of its gearing is facilitated under the operation of said movable speed change selector.

References Cited in the file of this patent
UNITED STATES PATENTS

| 1,588,004 | Blood | June 8, 1926 |
| 2,497,842 | Armitage et al. | Feb. 14, 1950 |